United States Patent Office 3,598,768
Patented Aug. 10, 1971

3,598,768
HETERO-AROMATIC AZOPOLYMERS
Hartwig C. Bach, Pensacola, Fla., assignor to
Monsanto Company, St. Louis, Mo.
No Drawing. Continuation of application Ser. No.
527,503, Feb. 15, 1966. This application July 9,
1969, Ser. No. 840,455
Int. Cl. C08g 33/00, 33/02
U.S. Cl. 260—2                                        6 Claims

ABSTRACT OF THE DISCLOSURE

Fiber forming azo polymers are prepared from aromatic primary diamines which contain an internal heterocyclic linkage by oxidative solution polymerization.

CROSS-REFERENCE TO RELATED APPLICATION

This is a continuation of application Ser. No. 527,503 which was filed Feb. 15, 1966 and is now abandoned.

This invention relates to new compositions of matter, and more particularly, to new azopolymers prepared from hetero-aromatic primary diamines.

Polymers containing azo linkages are well known in the prior art. Such polymers have been obtained by diazonium coupling of bis-diazonium salts with phenols, the polymers necessarily containing phenolic hydroxy groups, in ortho or para position to the azo linkage and by treatment of aromatic diamines with free radicals such as the t-butoxy radical to produce azopolymers containing the radical as a randomly distributed substituent on the polymer chain. Polyaryl polymers have been obtained by decomposition of bis-diazonium salts and consist mainly of chains of aromatic rings with a random incorporation of some azo groups. This invention provides azopolymers which are not restricted to those with specific substituents or a random distribution of azo groups in the chain.

Accordingly, it is an object of the present invention to provide new hetero-aromatic azopolymers prepared by oxidative solution polymerization of the corresponding hetero-aromatic primary diamines using as a catalyst a cupric ion complexed with a nitrogen base.

Another object is to provide new hetero-aromatic azopolymers having an ordered sequence of repeating units throughout the polymeric chain and each unit having a symmetrical configuration.

Yet another object of the invention is to provide high molecular weight fiber and film forming hetero aromatic azopolymers having high thermal resistance.

These polymers consist essentially of repeating units of the general formula

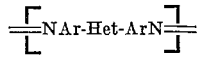

where Ar is an aromatic hydrocarbon radical, Het is a symmetrical heterocyclic radical.

Some of the azopolymers of the invention have the distinct character of Ar and Het merged to some extent so that no clear distinction can be made when Ar and Het are defined in the usual sense. In such instances the Ar radical actually shares two of its carbon atoms to form the hetero nucleus. For example, where the azopolymer is

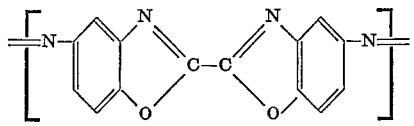

the Ar radical is actually a part of the hetero radical and the unit which is attached to the terminal N's of the repeat unit is commonly referred to as a benzoxazole. But for purposes of this invention it is to be understood that benzoxazole when used as shown above includes both Ar and Het. Alternatively, when the azopolymer is

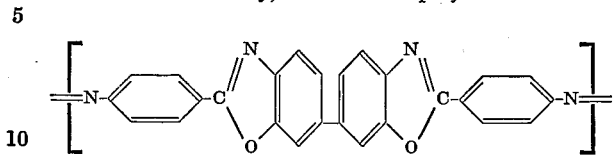

the two benzoxazole radicals are not attached directly to the terminal N's of the repeating unit and there are Ar radicals in addition to the benzene ring of each benzoxazole so that the repeating unit conforms to the general formula as shown. It should be kept in mind that in all cases the two terminal N's of the repeating unit must be directly attached to an aromatic hydrocarbon radical whether the aromatic hydrocarbon radical functions individually or whether it is actually a part of a hetero radical as in benzoxazole.

The aromatic hydrocarbon radical may be any single, multiple or fused ring system characterized by benzenoid unsaturation and containing from about 6 to 15 or more carbon atoms. Such aromatic radicals may be derived, for example, from benzene, biphenyl, naphthalene, diphenyl alkanes such as diphenyl methane, diphenyl ethane and diphenyl propane, other bridged diphenyls such as diphenyl sulfone, diphenyl ether and the like, and the corresponding compounds in which one or both of the aromatic rings contains one or more of the combination of lower alkyl, lower alkoxy, halogen, nitro, sulfonyl, lower carbalkoxy groups and the total number of carbon atoms in such substituent groups attached to an aromatic ring does not exceed nine. However, acid groups which are reactive with the catalyst used in polymerization or groups which are reactive in the sense of being oxidized by the catalyst are excluded. For example, acid groups such as —COOH, —SO₃H and oxidizable groups such as —SH, phenolic hydroxyl

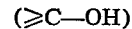

and —C≡CH, cannot be present as ring substituents.

Suitable heterocyclic radicals may be derived from, for example, pyridine, quinoline, bithiazole, 1,3,4-thiadiazole, 1,3,4-oxadiazole, thiazolothiazole, pyrazine, thiophene, bis-benzoxazole, bis-benzthiazole, and similar compounds.

As examples of the hetero-aromatic azopolymers of the invention, the following are typical:

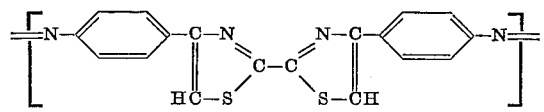

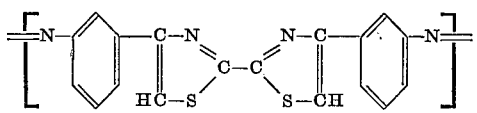

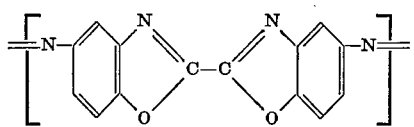

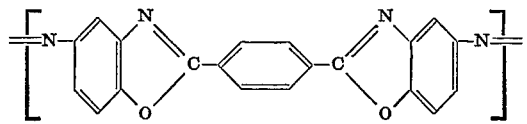

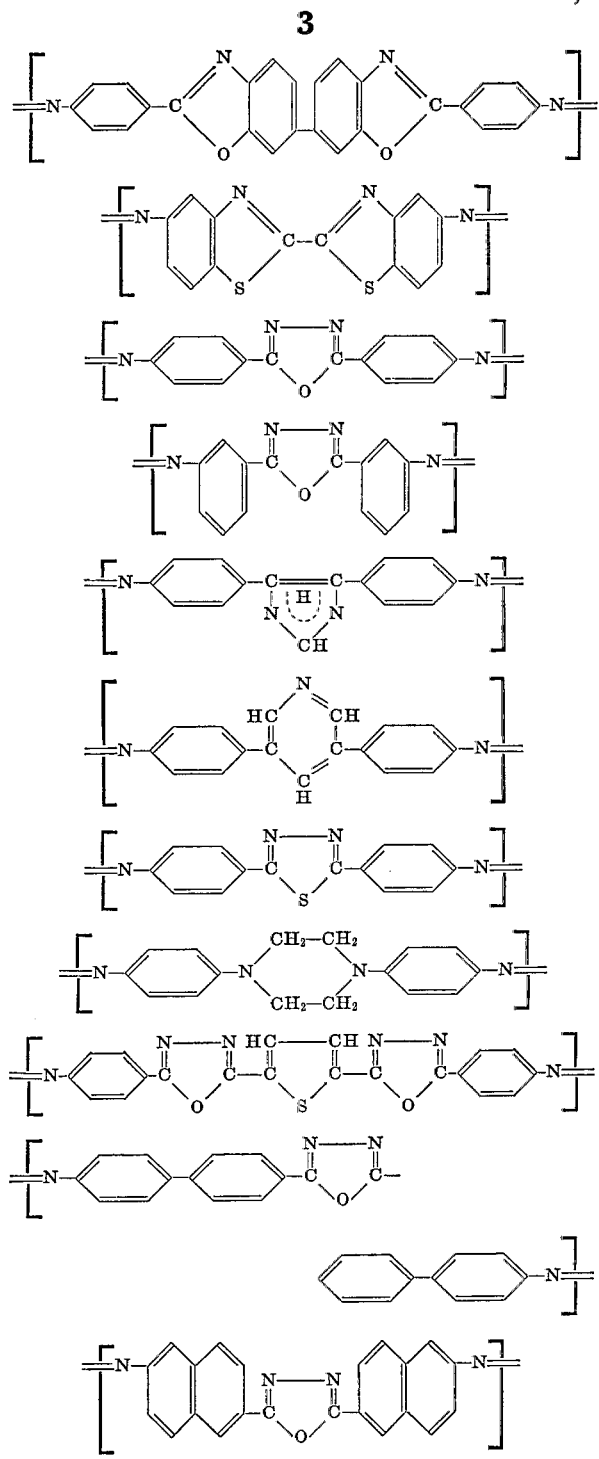

These polymers all have symmetrical repeating units, that is, each unit has a point or plane of symmetry. The two aromatic hydrocarbon radicals present in each repeating unit are identical in structure and the heterocyclic radical in each repeating unit is symmetrical. This symmetrical configuration contributes substantially to the thermal resistance of these heteroaromatic azopolymers and to their fiber, filament and film-forming properties.

One method of preparation of the polymers of the invention is polymerization of heteroaromatic primary diamines by an oxidative coupling process. This process generally consists of the oxidative solution polymerization of hetero-aromatic primary diamines effected by a catalyst system comprising a cupric ion complexed with a nitrogen base such as a tertiary amine, a cyclic amine or an N,N-dialkyl amide. The hetero-aromatic primary diamines used in the preparation of the polymers of the invention are those of the formula

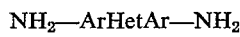

where Ar and Het have the significance previously given. The polymerization reaction may be illustrated as follows using a specific diamine for clarity.

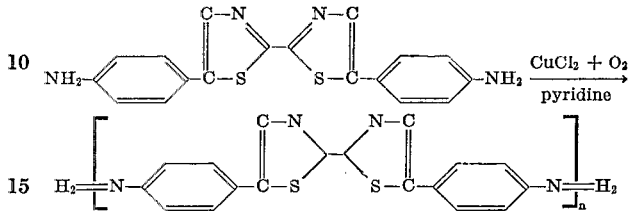

The invention is further elucidated by the following examples in which all parts and percents are by weight unless otherwise indicated.

EXAMPLE I

Preparation of a polymer having the repeating unit

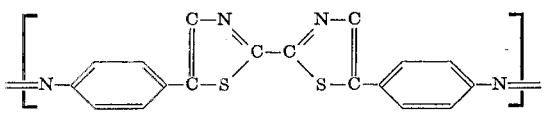

A 0.3 gram portion of $Cu_2Cl_2$ was oxidized with oxygen in a mixture of 20 ml. of pyridine and 15 ml. of dimethylacetamide. Then, 0.7 gram of 4,4'-bis(para-aminophenyl) 2,2'-bithiazole was added. Oxidation was continued for 3 hours at 25° C., then for 2 hrs. at 60° C. Approximately, 51.2 ml. of $O_2$ were absorbed, the theoretical amount being 49 ml. of $O_2$ at 25° C. The mixture was coagulated in 210 ml. of methanol. After coagulating the polymer, it was filtered off, washed with methanolic HCl and dried at 100° C. in a vacuum. A 0.67 gram yield of orange-red material was obtained. The inherent viscosity, as measured in a solution of 0.5 gram of polymer in 100 ml. of concentrated sulfuric acid at 30° C., was 0.44. A self-supporting film was cast from a concentrated sulfuric acid solution of the polymer.

Thermogravimetric analysis (TGA) of the polymer in nitrogen indicated that the polymer shows no decomposition below 350° C. and loses only 10% of its weight upon heating to 425° C.

EXAMPLE II

Preparation of a polymer having the repeating unit

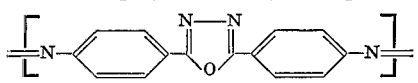

A 0.5 gram portion of $Cu_2Cl_2$ was oxidized with oxygen in a mixture of 10 ml. of pyridine and 40 ml. of dimethylacetamide. Then 1.25 grams (0.005 mol) of 2,5-bis(para-aminophenyl)oxadiazole was added. In 13 hrs. at temperatures of 79° C. a total of 98 ml. of $O_2$ was absorbed. The polymer was coagulated in 300 ml. of water. The inherent viscosity of the polymer as measured in a solution of 0.5 gram of polymer in 100 ml. of concentrated sulfuric acid at 30° C. was 0.14.

EXAMPLE III

Preparation of a polymer having the repeating unit

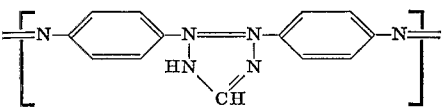

A 0.1 gram portion of $Cu_2Cl_2$ was oxidized with oxygen in a mixture of 5 ml. of pyridine and 20 ml. of DMAc. Then, 0.25 gram of 4,5-bis(p-aminophenyl)imidazole was added. In 3 hrs. at temperatures of 25–40° C., the reaction mixture absorbed 26 ml. of oxygen, the theoretical amount being 24 ml. of $O_2$ at 25° C. By coagulation of the reaction mixture in aqueous ammonia (4% $NH_3$), 0.25 gram of a dark polymer was obtained. The inherent viscosity of the polymer as measured in a solution of 0.5 grams of polymer in 100 ml. of concentrated sulfuric acid at 30° C. was 0.15.

EXAMPLE IV

Preparation of a polymer having the repeating unit

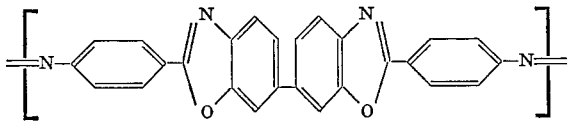

A 0.1 gram portion of $Cu_2Cl_2$ was oxidized with oxygen in a mixture of 5 ml. of pyridine and 20 ml. of DMAc. Then, 0.418 gram of 2,2'-bis(p-aminophenyl)-6,6'-bis-benzoxazole was added. In 6.5 hrs. at temperatures of 25–83° C., the reaction mixture absorbed 23.8 ml. of oxygen, the theoretical amount being 24 ml. of $O_2$ at 25° C. By coagulation, 0.41 gram of a brown-red polymer was obtained. The inherent viscosity of the polymer as measured in a solution of 0.5 gram of polymer in 100 ml. of concentrated sulfuric acid at 30° C. was 0.17 TGA in $N_2$ indicated no weight-loss of the polymer below 350° C., only a 10 percent loss in weight of the polymer upon heating to 420° C.

The azopolymers of this invention are useful in the preparation of fibers, filaments, films and other shaped articles for use in thermally resistant applications and other textile end uses. They may be used to prepare semi-conducting or photochromic materials and related products.

I claim:
1. An azopolymer consisting essentially of repeating symmetrical units represented by the formula

wherein Ar is a radical containing at least one aromatic carbocyclic ring forming an integral part of the chain of said azopolymer; Het is a radical containing at least one or, together with at least two carbon atoms of an aromatic carbocyclic ring of each Ar, more than one heterocyclic ring of 5 or 6 carbon atoms, having at least one O, S or N ring atom and forming an integral part of the chain of said azopolymer; and at least two of said rings are linked together solely through a bond between one ring atom of each of two of said rings.

2. The azopolymer of claim 1 wherein Ar is p-phenylene.

3. The azopolymer of claim 1 wherein Ar is m-phenylene.

4. The azopolymer of claim 1 wherein Ar is p-phenylene and Het is bis-benzoxazole.

5. The azopolymer of claim 1 wherein Ar is p-phenylene and Het is bithiazole.

6. The azopolymer of claim 1 wherein Ar is p-phenylene and Het is oxadiazole.

References Cited

UNITED STATES PATENTS 3,514,415  5/1970  Karol _____ 260—2

FOREIGN PATENTS 907,105  10/1962  Great Britain _____ 260—2

SAMUEL H. BLECH, Primary Examiner

U.S. Cl. X.R.

96—115; 252—62.3; 260—29.2, 30.8, 47, 79, 79.3